Dec. 24, 1968  A. O. AKERMANIS  3,417,723
AUXILIARY STEERING DEVICE FOR AN OUTBOARD MOTOR BOAT
Filed Aug. 18, 1967  3 Sheets-Sheet 1

Andrey O. Akermanis
INVENTOR.

BY Roger L. Martin

ATTORNEY

Dec. 24, 1968  A. O. AKERMANIS  3,417,723
AUXILIARY STEERING DEVICE FOR AN OUTBOARD MOTOR BOAT
Filed Aug. 18, 1967  3 Sheets-Sheet 2
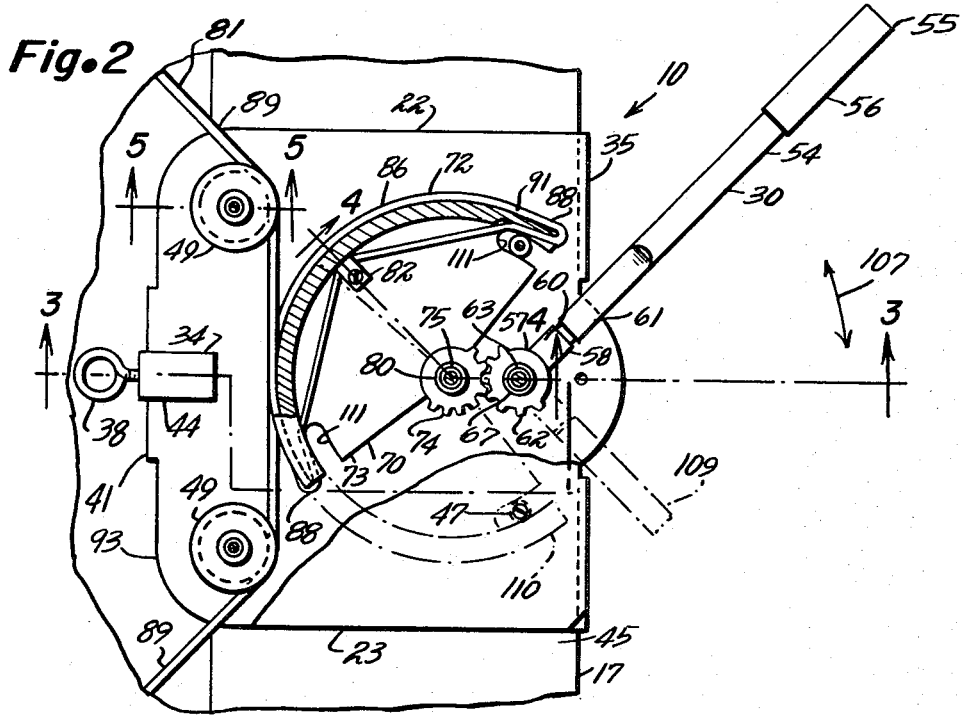
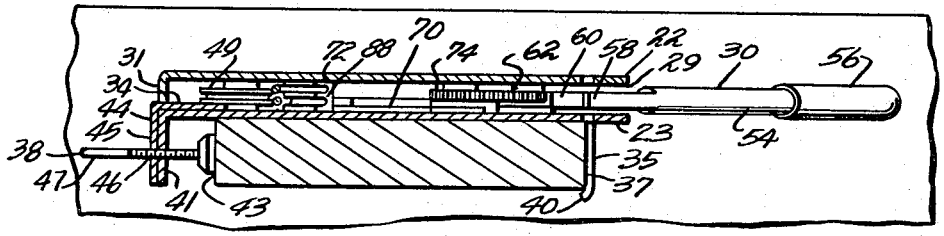
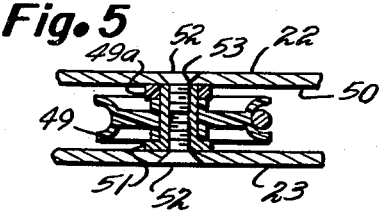
Andrey O. Akermanis
INVENTOR.
BY Roger L. Martin
ATTORNEY Dec. 24, 1968   A. O. AKERMANIS   3,417,723
AUXILIARY STEERING DEVICE FOR AN OUTBOARD MOTOR BOAT
Filed Aug. 18, 1967   3 Sheets-Sheet 3

Andrey O. Akermanis
INVENTOR.

BY Roger L. Martin

ATTORNEY

United States Patent Office 3,417,723
Patented Dec. 24, 1968

3,417,723
AUXILIARY STEERING DEVICE FOR AN OUTBOARD MOTOR BOAT
Andrey O. Akermanis, 3401 N. Westmoreland Drive, Orlando, Fla. 32804
Filed Aug. 18, 1967, Ser. No. 661,662
8 Claims. (Cl. 114—144)

ABSTRACT OF THE DISCLOSURE

The disclosure relates to an auxiliary steering device for an outboard motor boat. The device is portable and is attachable to a seat in a small boat and whereat a flat housing for certain components of the device is provided as a sitting place for the helmsman. The device is characterized by a manually manipulatable pivot arm which extends forwardly from the flat housing and which enables the helmsman to steer the boat with either his hands or his legs from a sitting position or from a standing position at which the pivot arm is manipulatable by leg movements.

The housing is made from two plates in the embodiments disclosed and the bottom plate is appropriately bent to enable a screw element to be used in clamping the housing to the seat. The other plate component of the housing is bent to provide appropriate side walls in the housing.

The pivot arm extends through a front opening in the housing and is pivotally connected internally of the housing to the plate components of the housing. Internally of the housing is another arm member which is provided with arcuate grooved edge portion. This arm member is also arranged to pivot about an axis. In one embodiment the pivot arm and the rigid arm member are rigidly interconnected and are pivotally movable together about the pivot axis for the arm in a center lever type arrangement. In the preferred embodiment, both the pivot arm and the rigid arm member, carrying segments which mesh so that the rigid arm member is pivotally moved through a gear connection with the pivot arm. The arrangement is such that the housed arm member pivots about a pivot axis which is offset from the pivot axis for the manipulatable pivot arm.

The pivotal motion of the arm member is transmitted to the motor by means of cable lengths that are trained around spaced pulleys which are connected to the hull of the boat to the rear of the housing through spring devices that maintain the cable lengths under tension. Guide pulleys for the cable lengths are also provided internally of the housing and here the lengths are fastened to the housed arm member. An outer edge portion of the housed arm has a groove for each cable length and these grooves are vertically spaced to prevent entanglements between the lengths as the lengths are drawn in and paid out during the pivotal movement of the rigid arm.

The cable lengths are fastened to the housed arm by a fastener carried by the arm and which is located between the arcuate edge and the pivot axis for the arm member and to maintain proper orientation of the lengths in the grooves, guide holes are provided in one embodiment at the opposite ends of the arcuate portion of the arm.

Background of the invention

Various devices have been proposed for use as auxiliary steering devices for outboard motor boats and which eliminate the need for hand manipulation of the steering device by the helmsman. Such devices are advocated because fishermen frequently encounter the need for the use of both hands on the fishing rod and sometimes under conditions where the need also arises to steer the boat as it is being propelled by an outboard motor.

Most of the auxiliary steering devices heretofore advocated are manipulated by the fisherman's foot and this makes it difficult, if not impossible, for the fisherman to assume a standing position in the boat and simultaneously steer the boat from the standing position. In addition most of such devices are complicated in structure and are not readily portable, being instead more or less permanent fixtures in the boat. Many fishermen use boats rented at different locations and there is a need for a portable outboard motor boat steering device which can be easily moved about and attached and detached from boats located at various places and which enables the fisherman to fish from a standing position in the boat while nevertheless enabling him to adequately maneuver the boat in the water without the need for using his hands in maneuvering the boat.

Summary

The instant invention relates to a portable device which is adapted to serve as an auxiliary steering device for outboard motor boats.

A general object of the invention is to provide an improved steering device for outboard motor boats and which is not only portable but also enables the fisherman when he desires, to steer the boat from a standing position in the boat and without the need for using his hands in accomplishing the boat maneuvers.

Another object is to provide an auxiliary steering device of the kind contemplated and which enables the fisherman to cast and otherwise manipulate the fishing rod with both of his hands and from either a standing or a sitting position in the boat while nevertheless permitting the fisherman to adequately steer the boat.

Yet a further object is to provide an auxiliary steering device which is simple in construction and inexpensive to manufacture and which is attachable to a seat in the boat whereat the boat can be steered from either a sitting or standing position.

A further object is to provide a portable steering device of the kind contemplated and which involves a simple pivotal movement of a pivot arm so located as to enable the fisherman to steer the boat by leg motions or by hand manipulations if desired and from either a standing or sitting position.

In accord with the invention a rigid arm member is pivotally mounted in a flat housing that is adapted to rest on a seat in the boat and to provide a sitting place for the helmsman. The arm member is connected in movement to the boat motor by a flexible cable type connection and is pivotally moved in the housing by the manipulation of a simple pivot arm that extends forwardly of the housing and whereat the helmsman can manipulate the arm from a sitting position or from a standing position in front of the housing. The housing is provided with a suitable device for attaching the housing to a boat seat and which is releasable to facilitate its detachment from the seat and thereby to permit the device to be carried about.

The housed arm member, in accord with certain aspects of the invention, has an edge portion that defines an arc centered at the pivot axis for the member, and the edge portion is provided with separate and vertically spaced grooves for cable lengths that extend to the motor. Appropriately spaced pulleys are arranged in the housing to guide the lengths to the exterior of the housing and the grooved arrangement in the housed arm is such as to prevent the separate lengths from becoming entangled during its pivotal movement.

In the preferred embodiment and in accord with another aspect of the invention, the pivot arm and cable carrying member are interconnected in movement by a gear type arrangement. The gear connection serves to dampen the transmisison of motor vibrations to the pivot arm and also permits the manufacturer to vary the motor movement which results from movement of the pivot arm and hence to vary the steering sensitivity of the device in accord with its contemplated usage through the selection of different gear ratios. In accord with yet another aspect of the invention, the pivot arm and the cable connected pivotal member are rigidly interconnected and are pivotally movable about a common pivot axis in a centrally type arrangement. This arrangement provides the simplest and least expensive device to manufacture.

*Brief description of the drawings*

Reference is now made to the drawings and wherein:

FIG. 2 is a top plan view of the device shown in FIG 1 with part of the top wall of the housing broken away to expose the housed components, the pivot arm being shown in FIG. 2 in a position different from that seen in FIG. 1, and certain parts of the housed arm member being also broken away to expose other structure.

FIG. 3 is a vertical view generally taken in section through the housing along the lines 3—3 of FIG. 2.

FIG. 4 is an enlarged vertical section view generally taken along the lines 4—4 of FIG. 2.

FIG. 5 is an enlarged vertical section view generally taken along the lines 5—5 of FIG. 2.

*Description of embodiments*

Figure 1:
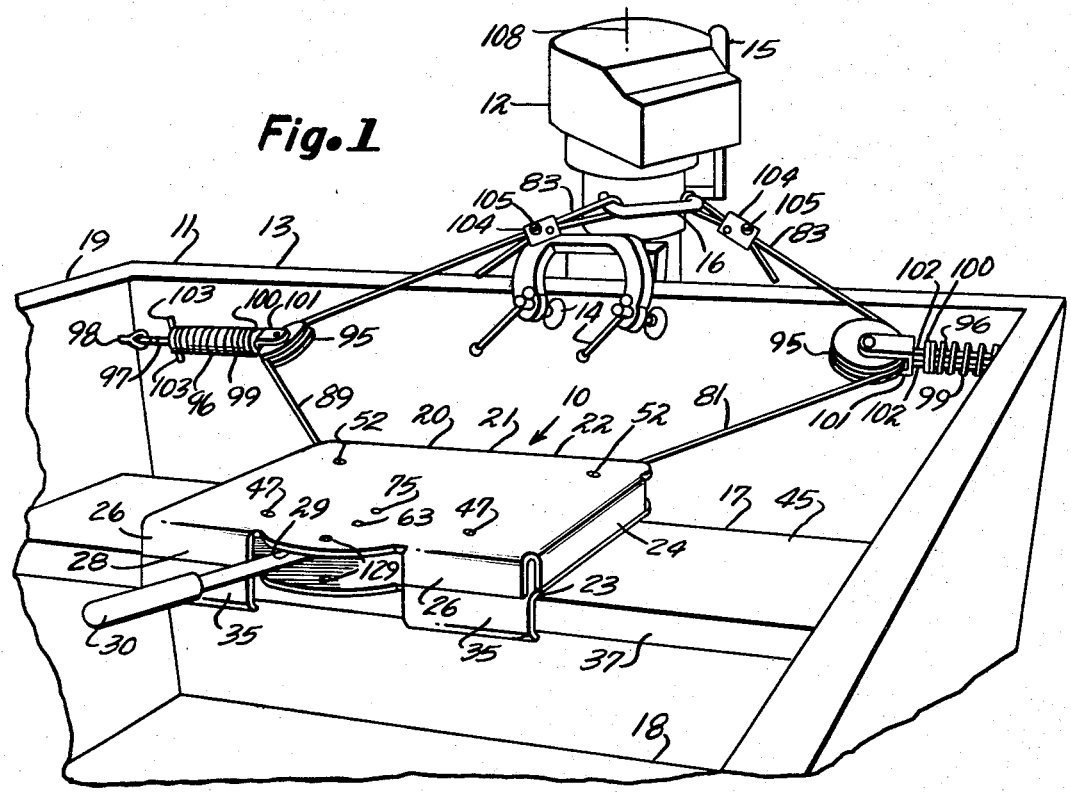
FIG. 1 is a perspective view of a preferred embodiment of the invention and shows the auxiliary steering device as installed in a boat that is equipped with an outboard motor.

Reference is now made to the preferred embodiment of the invention shown in FIGS. 1–7 and wherein the portable auxiliary steering device is designated generally at 10. Device 10 is shown in FIG. 1 as installed in a small boat designated at 11. Boat 11 is equipped with a conventional screw type outboard motor 12 for propelling the craft through the water, and the motor as shown in FIG. 1 is clamped to the transom 13 by suitable clamps 14. Motor 12 has the usual handle 15 for use in steering of the boat in the absence of the auxiliary steering device 10, and this handle 15, as seen in FIG. 1, has been pivoted to and suitably locked in a vertical out-of-the-way position that enables the auxiliary steering device 10 to be fastened to the lift handle 16 of the motor. Boat 11 is shown with a flat transversely extending seat 17 adjacent the transom and which is appropriately supported above the bottom 18 of the boat and mounted on the hull 19 at its opposite ends.

The steering device 10 has a flat housing 20 which is adapted to rest on the seat 17 and which is provided with a flat upper surface 21 that serves as a sitting place for the helmsman or operator of the boat. Here a cushion may be placed to provide greater comfort for the helmsman if desired or, for that matter, another type seat structure can be supported on the housing 20.

Figure 6:
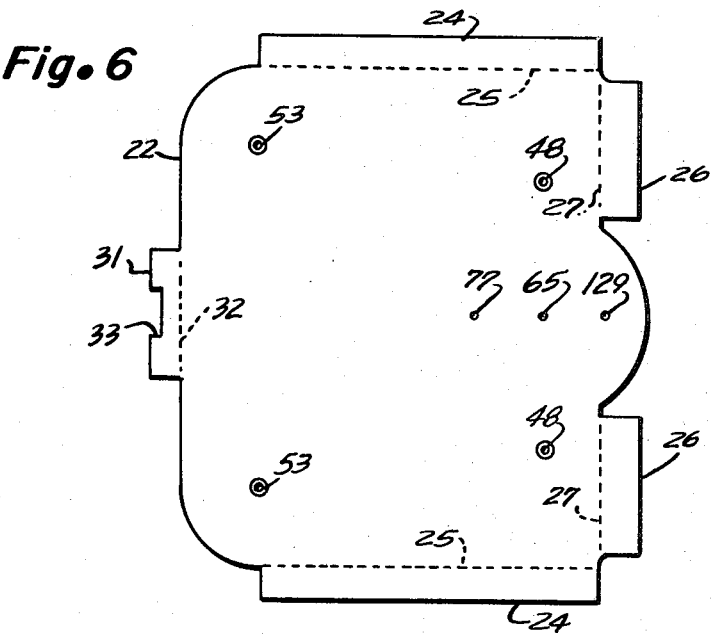
FIG. 6 is a plan view of cut metal blank which is appropriately bent to form the top and side walls of the housing.
Figure 7:
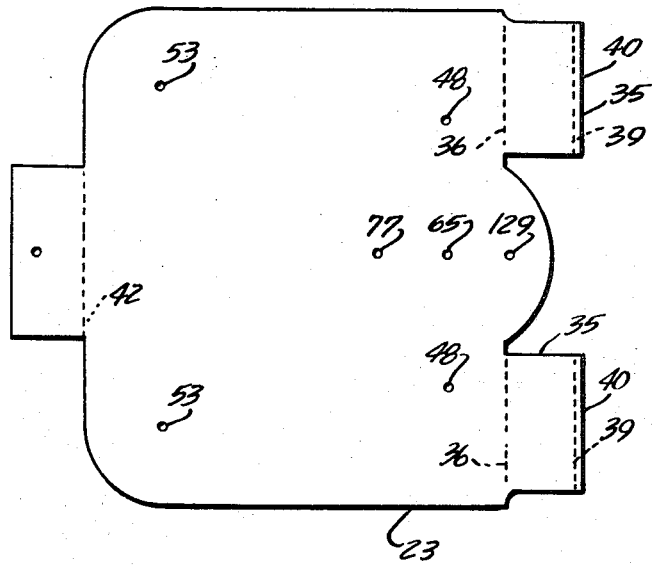
FIG. 7 is a plan view of a cut metal blank which provides the bottom wall of the housing which is appropriately bent to form certain components used in fastening the housing to the boat seat.

The housing 20 is illustrated in the drawings as made from two flat metal plates 22 and 23 which are initially cut in the configurations seen in FIGS. 6 and 7 and thereafter bent along the broken lines indicated in these figures.

The top plate 22 as seen in FIG. 6 has opposite side edge portions 24 which are bent downwardly along the lines 25 to form the opposite side walls in the assembled housing. The front of the plate has laterally spaced edge sections or portions 26 which are bent downwardly along the lines 27 to form the front wall 28 of the housing. By virtue of the spaced relation of the edge portions 26, the front wall 28 has a center opening 29, seen in FIG. 1, to accommodate the location of the pivot arm 30 that is manipulated by the helmsman in front of the housing during use of the device. The rear of plate 22 has a centrally located edge section or portion 31 which is bent downwardly along the lines 32 to provide the rear wall of the housing. This edge portion 31 has a notch 33 to accommodate the location of one leg 34 of a flat L-shaped metal strap 44 referred to subsequently.

The bottom plate 23, as seen in FIG. 7, has a pair of laterally spaced front edge sections 35 which are bent downwardly along the lines 36 so as to lap the front edge 37 of the seat and to thereat provide the front members of a clamping device designated at 38. Device 38 is used in releasably securing the housing to the seat. Edge sections 35 are also bent along the lines 39 to provide edge extremities 40 that underlie the flat seat, as seen in FIG. 6, to provide better engagement with the seat.

The rear of plate 23 has a central edge portion 41 that is bent downwardly along the lines 42 to lap the rear edge 43 of the seat in the offset manner shown in FIG. 4. The strap 44 is spot welded to the edge 41 in the position shown in FIGS. 2 and 3. The depending leg 45 of strap 44 and the back edge 41 of plate 23 are provided with aligned threaded bores 46, collectively designated at 46. Here the steering device is provided with a screw element 47 which is threaded in the bores 46 and which as a component of the clamp 38 is provided to engage the rear edge 43 of the seat and cooperate with the bent edges 35 in releasably fastening the housing to the seat. Other means for releasably fastening the housing to the seat may be employed and if desired the bottom plate 23 may be adapted and suitably arranged to reverse the location of the seat edge lapping front and rear edge plate sections.

From FIG. 3 it is evident that the bottom plate 23 is adapted to rest on the upper surface 45 of the seat when the steering device is in use. In the assembled housing, the top plate 22 is supported spacedly above the bottom plate at the front of the housing on a pair of laterally spaced cylindrical spacer sleeves 46. Here the plates 22 and 23 are rigidly fastened to the sleeves 46 by means of machine screws 47 which are threaded in the opposite ends of the sleeves with their heads counter sunk in aligned holes 48 in the top and bottom plates. A pair of pulleys 49 are mounted in the space 50 between plates 22 and 23, and these pulleys 49 are laterally spaced apart in the housing and rotatably mounted on a pair of flanged sleeves designated at 51. Here at this end of the housing the pulleys are spaced from the bottom plate 22 by the flange of the sleeve and from the top plate by suitable washers 49a. The top plate 22 is supported spacedly above the bottom plate 23 on the sleeves 51 and the plate members 22 and 23 of the housing are rigidly held in place by aligned machine screws 52 that are threaded in the opposite ends of the sleeves. The plate members are here provided with counter sunk holes 53, as seen in FIG. 5 to accommodate the heads of the screws.

The pivot arm 30 of the embodiment shown in FIGS. 1–7 comprises an elongated tubular member 54 which is equipped at the outer end 55 of the arm with a hand grip 56 made from rubber or other suitable material. At the opposite end 57 of the arm 30, the tubular member 54 is equipped with a metal adapter 58 for use in mounting the arm 30 for pivotal movement in the general horizontal plane of the flat housing. Adapter 58 has a flat generally circular metal plate section 59 and a radially extending short metal plate section 60 which is formed integral with section 59. Section 60 is adapted to fit in the inner end 61 of the tubular member 54 as seen in FIG. 2 and here member 54 is crimped on the narrow plate section 60 to rigidly interconnect the adapter 58 and grip carrying component 54 of the arm.

The circular plate section 59 carries a flat gear segment 62 that is welded to the adapter 58, and the gear equipped arm 30 is pivotally connected to the housing in the space 50 between the plates by means of a vertical pin 63. Pin 63 extends through the hub of the gear segment 62 and also through an appropriately aligned bore 64 in the adapter segment 59. The opposite ends of pin 63 are adapted to fit in aligned holes 65 in the top and bottom plate members 22 and 23 of the housing. The circular segment 59 is supported on a suitable washer-like element 66 that serves as a bearing member between the adapter 58 and bottom plate 23 at the lower end of pin 63. The gear segment 63 of the pivot arm assembly 30 on the other hand is spaced on the pin 63 from the top plate 22 by another suitable washer element designated at 67. Elements 66 and 67 may be made of Teflon or other suitable plastic or metallic material if desired.

As seen in the drawings, the pivot arm arrangement is such that the arm 30 extends forwardly of the pivot 63 therefore through the opening in wall 28 and is manipulatable by the helmsman in front of the housing. Pivot arm 30 is connected in the space 50 between the plates 22 and 23 to another rigid arm member 70 which is also arranged to pivot in the general plane of the flat housing and about a pivot axis designated at 71. Arm 70 has an elongated arcuate edge section or portion 72 which is formed integral with a flat, more or less semi-circular plate portion or section 73. Section 73 carries a gear segment 74 at the center of the arc defined by the edge portion 72 and this segment 74 is spot welded to section 73 and the rigid arm member 70 is pivotally connected to the housing 20 by a vertical pivot pin 75. Pin 75 extends through the hub of segment 74 and through an appropriately aligned bore 76 in the plate section 73. The opposite ends of pin 75 are adapted to fit in aligned holes 77 in the top and bottom housing plates 22 and 23. Pin 75 establishes a pivot axis 71 for the pivotal movement of arm 70 and axis 71 extends through the center 78 of the arc defined by section 72 and is also parallel to and offset from the pivot axis 68 established by pin 63.

The arcuate section 72 is slidably supported on the bottom plate 23 at the outer side of the member 70, and section 73 is supported at the pin 75 on a suitable washer-like element 79 that serves at the lower end of pin 75 as a bearing member between section 73 and the bottom plate 23 of the housing. The gear segment 74 of member 70 is spaced from the top plate 22 on pin 75 by another suitable washer element 80. Elements 79 and 80 like elements 66 and 67 may be made from Teflon or some other suitable plastic or metallic material.

Arm 70 is pivotally moved about the axis of pin 75 by the pivotal movement of arm 30, and the pivotal movement of the former is transmitted to the motor 12 by means of an elongated flexible cable 81. Cable 81 is releasably fastened to arm 70 by means of a clamp element 82 which is carried by arm 70. Element 83 engages the cable 81 intermediate its opposite ends 83 and is releasably fastened to the section 73 by means of a machine screw 84 that is threaded in a suitable bore in the section.

The opposite end lengths 89 of the cable 81 extend from the clamping element or fastener 82 at the back face 90 of edge section 72 through respective openings 91 at the opposite ends 88 of the arcuate section 72. The outer face 86 of the section 72 has a pair of vertically spaced grooves 87 and each opening 91 is associated with one of the grooves 87 and so arranged that the length passes into its groove at the outer face 86. As seen in FIG. 3, the cable lengths 89 cross in passing from arm 70 to the housed pulleys 49. The grooved arrangement in the outer face 86 of the section 72 serves to maintain the lengths in vertical spaced relation at the outer face 86, and aids in avoiding entanglements during pivotal movement of the arm 70.

In the arrangement depicted in FIG. 1, the lengths 89 pass along the outsides of pulley 49 after they cross in back of arm 70 and then pass to the exterior of the housing through the adjacent opening 93 at the back side of the housing. Exteriorly of the housing 20 the steering device 10 as seen in FIG. 1, is also equipped with another pair of pulleys 95. These pulleys are connected to the hull 19 of the boat in back of the housing 20 and at the opposite sides of the transom 13. Each of these pulleys 95 is associated with one of the cable lengths 89 and is connected to a spring device 96 for maintaining the lengths 89 under tension. Each device 96 has a rod 97 which is hooked at one end in an eye element 98 that is screwed in the side of the hull as seen in FIG. 1. Rod 97 extends through a coil spring 99 and is fixed to a plate 100 that embraces the pulley side end of the spring. These rod elements 102 are bent to provide end lapping feet 103 at the other end of the spring. The rods are slidable in appropriately arranged holes in plate 100 and the spring 99 in the installation is under compression between the foot elements 103 and plate 100 so that the lengths are maintained under compression.

The opposite ends 83 of the elongated flexible cable 81 are fastened or connected to the lift handle 16 as illustrated in FIG. 1. Here each end is looped around the lift handle 16 and appropriately fastened by a conventional cable clamp 104 which is releasably clamped to the cable by screw type fasteners 105.

Pivot arm 30 is adapted to swung on pin 63 in the general plane of housing 20 as indicated by arrow 107, and by virtue of the gear type connection with the rigid pivot member 70, member 70 is caused to pivot about the axis 71 of pin 75 in the same direction as arm 30 during the pivotal movement of the latter. Thus when arm 30 is caused to pivot toward the left side of the housing, as seen in solid lines in FIG. 2, member 70 pivots in the same direction. This draws in the length attached to the right side of the motor handle 16 and pays out the length attached to the left side of the motor handle 16. This of course causes the motor to pivot in the appropriate direction about the steering axis 108 of the motor and serves to steer the boat toward the left. On the other hand, when the pivot arm 30 is pivoted to the right side of the housing as indicated by the broken line position at 109 in FIG. 2, member 70 pivotally moves to the position indicated at 110. This draws in the length attached to the left side of handle 16 and pays out the cable length attached to the right side of the handle with the result that the motor is caused to pivot about axis 108 in the appropriate direction to accomplish a right hand turn for the boat. It will be noted in FIG. 2 that section 73 of arm 70 has a pair of notches 111 to accommodate the location of the spaced sleeves 46 during the pivotal movement of the arm 70.

Among the advantages of the invention is that the helmsman can steer the boat without the discomfort of having his arm extending to the rear seat 70 in order to manipulate the steering handle 15. In addition, the helmsman can stand in the boat in front of seat 17 and with his feet on the bottom 18 and legs straddling arm 30 can steer the boat by leg movements which cause the arm 30 to pivot in the appropriate direction while nevertheless leaving the hands free for fishing purposes from the standing position. When the helmsman is seated on the housing 20, he can steer the boat by moving his legs to manipulate the arm 30 and this of course also permits him to fish with both hands on the rod.

The gear drive connection provided by gear segments 62 and 74 is illustrated as having a 1:1 ratio solely for illustration purposes. By changing the gear ratio the steering sensitive can be varied by the manufacturer to provide more or less pivotal movement of the motor in response to the movement of arm 30. The arrangement thus permits the manufacturer to provide an auxiliary device for heavy motors.

Figure 8:
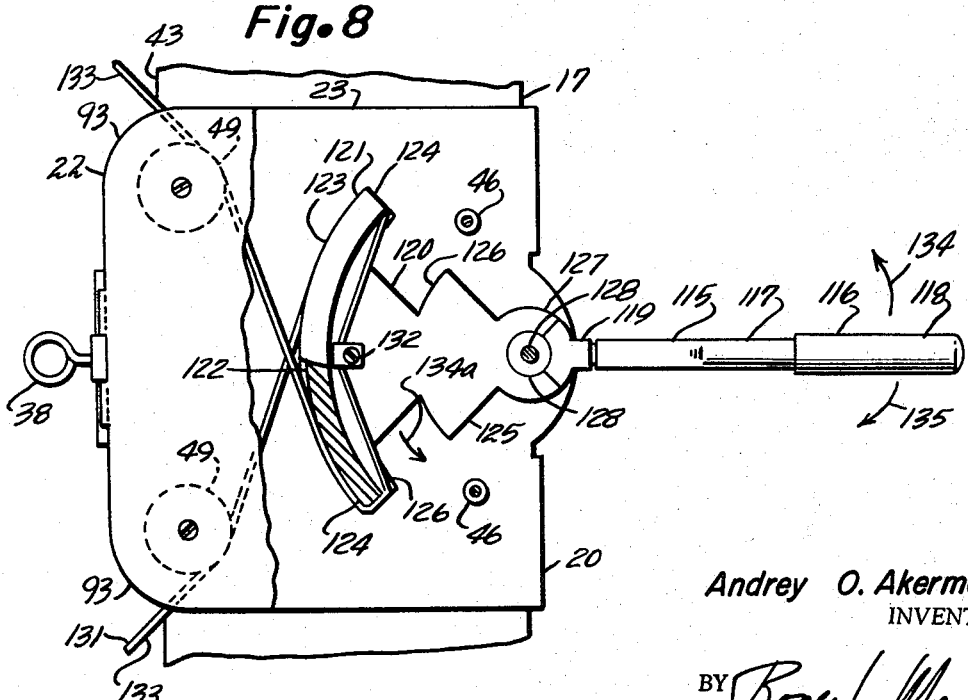
FIG. 8 illustrates in top plan view with parts of the housing broken away of another embodiment of the invention and wherein the hand manipulatable pivot arm and housed pivotal member are rigidly connected in a center lever type arrangement.

Reference is now made to the embodiment shown in FIG. 8. The housing 20 and the pulley 49 arrangement here is the same as in the prior embodiment and hence common numerals are used for corresponding parts. However, the pivot arm and the rigid arm member of the device shown in FIG. 8 are rigidly connected in a center lever type arrangement as opposed to the gear connected arrangement for the previous embodiment.

The pivot arm of the lever 115 is designated at 116 in FIG. 8 and includes an elongated tubular member 117. Member 117 is equipped with a grip 118 at its outer ends and the inner end of the arm has an adapter 119 which is adapted to fit in the adjacent inner end of member 117 and whereat the member 117 is crimped on the adapter 119 to provide a rigid connection thereat.

The other rigid arm member 120 of lever 115 in this instance has an arcuate edge portion or section 121 that is provided with vertically spaced grooves 122 at the outer face 123. These grooves 122 however unlike the previous embodiment also extend around the opposite ends 124 of the section 121. Member 120 has a flat plate section 125 which is integral with the arcuate section 121 and notches 126 are provided in section 125 to accommodate the location of the spacers 46 during the pivotal movement of the lever. Section 125 has an integral more or less circular plate portion 127 at the center of the arc defined by section 121, and here lever 115 is pivotally connected to the housing 20 by a pivot element 128. Element 128 is adapted at its opposite ends to fit in aligned holes 129 in plates 22 and 23. The adapter of arm 116 is welded to the circular plate portion 127 of member 120 to provide a rigid connection between the pivot arm 116 and member 120 of lever 115. Section 127 is disposed between suitable spacers 130 carried on pin 128 and pin 128 of course defines a vertical pivot axis for the pivotal movement of the lever.

The cable 131 in this instance is fastened to section 125 by a fastening device 132 like the one used in the previous embodiment, and the opposite end lengths 133 of the cable extend from the fastener 132 around the grooved ends 124 of section 125 and into the respective grooves in the outer face 123 of the section 125. Here the lengths 133 cross in passing or extending to the pulleys 49 as seen in FIG. 8 then pass to the exterior of the housing through the opening 93. Exteriorly of the housing the lengths 133 extend to the motor in the manner shown in FIG. 1 with respect to the previously described embodiment.

The arrangement is such that lever 115 is pivotally moveable about the axis of pin 128 in the general plane of housing 20. This axis is normal to the general plane of the housing and as the arm 116 is caused to pivot toward the left side of housing 20 in the direction of arrow 134 member 120 swings in the space 50 toward the right side of the housing in the direction of arrow 134a. This draws in the length which is trained around the left side pulley 49 seen in FIG. 8 and pays out the other length. This causes the motor to pivot in the appropriate direction to steer the boat to the right. On the other hand when the arm is manipulated in the direction of arrow 135 the arrangement is such as to steer the boat to the left.

Like the first embodiment described herein, the housing 20 of the embodiment shown in FIG. 8 provides a sitting place for the helmsman and is so adapted that the helmsman can fish with both hands on the fishing rod and from either a sitting or a standing position and nevertheless steer the boat by manipulating the lever with leg movements. Thus from a standing position and with his legs straddling the pivot arm 116 of lever 115 the helmsman is able to pivotally move the lever 115 to steer the boat while nevertheless having his hands free to manipulate the fishing rod.

The embodiment shown in FIG. 8 is less costly to manufacture in comparison to the first embodiment.

While only certain preferred embodiments of this invention have been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. A portable auxiliary steering device for an outboard motor boat comprising a flat housing adapted to rest on a seat of the boat and to thereat provide a sitting place for the helmsman, means for releasably fastening said housing to the seat, a pivot arm pivotally connected to said housing and pivotally moveable in the general plane of said housing about a pivot axis which is normal to said plane, said arm being arranged to extend forwardly of and from within said housing and being manually manipulatable by the helmsman in front of said housing, a rigid member located within said housing and therein connected to said pivot arm, said rigid member being pivotally moveable in the general plane of said housing by pivotal movement of said pivot arm, and elongated flexible means connected to said rigid member and being connectable in back of said housing to the outboard motor to thereat pivotally move the motor about the steering axis thereof in accord with the pivotal movements imparted to said rigid member by the manipulation of said pivot arm.

2. A portable auxiliary steering device for an outboard motor boat in accord with claim 1 wherein said rigid member is rigidly connected to said pivot arm and pivotally moveable with the arm about said pivot axis.

3. A portable auxiliary steering device for an outboard motor boat in accord with claim 1 wherein said rigid member is pivotally moveable about an axis which is offset from said pivot axis and wherein said rigid member and said pivot arm are interconnected by gear means.

4. A portable auxiliary steering device for an outboard motor boat in accord with claim 1 and further comprising guide means mounted within said housing for therein guiding said flexible means, and guide means connectable to the hull of the boat for guiding said flexible means exteriorly of said housing.

5. In combination with an outboard motor boat including an elongated transversely extending flat seat having front and rear edges, a portable auxiliary steering device comprising: a flat housing having a bottom plate member resting on said seat and a top plate member which is supported spacedly above said bottom plate member and arranged to provide a sitting place for the helmsman, said bottom plate member having front and rear sections which are bent downwardly to lap the respective front and rear edges of the seat, said top plate having front sections which are bent downwardly to provide a front wall of the housing and which are spaced apart to provide an opening in said front wall; means releasably fastening said housing to said seat include screw means mounted in one of said front and rear sections and cooperating with the other of said front and rear sections in releasably clamping said housing to said seat; pivot means arranged in the space between said bottom plate member and said top plate member and establishing a pivot axis which is normal to the general plane of said flat housing; an elongated pivot arm having opposite ends and being pivotally connected to said housing at one of said ends by said pivot means, said pivot arm being pivotally moveable in the general plane of said flat housing about said pivot axis, said pivot arm being arranged to extend forwardly of said pivot means through said opening and being manipulatable in front of said housing at the other of said opposite ends by the helmsman; a rigid member arranged in said space and connected to said pivot arm, said rigid member having an arcuate edge portion and being pivotally moveable in the general plane of said flat housing about an axis which is normal to the general plane of said flat housing and through the center of the arc defined by said arcuate edge portion, said arcuate edge portion having opposite ends and a pair of vertically spaced grooves which are arranged in parallel and extend between the opposite ends of said arcuate edge portions; a pair of pulleys which are spaced apart and rotatably mounted in the housing in back of said pivot means; releasable fastening means carried by said rigid member between said arcuate edge portion and the axis for pivotal movement of said rigid member; elongated flexible means having opposite ends and being releasably secured at its opposite ends to the outboard motor and being releasably fastened intermediate its opposite ends to said rigid member by said fastening means, said elongated flexible means including a pair of opposite end lengths respectively arranged at the opposite ends of said arcuate edge portion and located in the respective grooves thereat, said opposite end lengths being trained over the respective pulleys of said pair; pulley means in back of said housing and respectively associated with said lengths; and means fastened to the hull of said boat and connected to said pulley means for maintaining said lengths under tension.

6. In combination with an outboard motor boat including an elongated transversely flat seat having front and rear edges, a portable auxiliary steering device in accord with claim 5 wherein said rigid member is rigidly connected to and pivotally moveable with said pivot arm about pivot axis.

7. In combination with an outboard motor boat including an elongated transversely extending flat seat having front and rear edges, a portable auxiliary steering device in accord with claim 5 wherein said pivot arm has a gear segment at the one of the opposite ends of the pivot arm and which pivotally moves with the pivot arm about said pivot axis; and wherein said rigid member has a gear segment located at said center and which pivotally moves with said rigid member about the axis for pivotal movement of the rigid member, the gear segment of said pivot arm being in mesh with the gear segment of said rigid member and therewith providing a gear drive connection between said rigid member and said pivot arm.

8. In combination with an outboard motor boat including an elongated transversely extending flat seat having front and rear edges, a portable auxiliary steering device in accord with claim 1 wherein said rigid member has a pair of openings respectively located at the opposite ends of said arcuate edge portion and associated with the respective grooves, and wherein each of said lengths extend from the fastening means through respective ones of said openings to the respective grooves.

References Cited

UNITED STATES PATENTS

| | | | |
|---|---|---|---|
| 2,402,724 | 6/1946 | Bidwell | 114—144 |
| 2,666,407 | 1/1954 | Wilkirson | 114—144 |
| 2,845,891 | 8/1958 | Frey | 114—144 |

ANDREW H. FARRELL, *Primary Examiner.*

U.S. Cl. X.R.

74—480